Nov. 21, 1933.  C. A. RUESENBERG  1,936,030
CENTRIFUGAL CLUTCH
Filed Jan. 22, 1932  3 Sheets-Sheet 1

Inventor:
Carl A. Ruesenberg
By Wilson, Dowell, McCanna & Rehm
Attys

Nov. 21, 1933.       C. A. RUESENBERG       1,936,030
CENTRIFUGAL CLUTCH
Filed Jan. 22, 1932       3 Sheets-Sheet 2

Inventor
By Carl A. Ruesenberg
Wilson, Dowell, McCanna & Rehm
Attys.

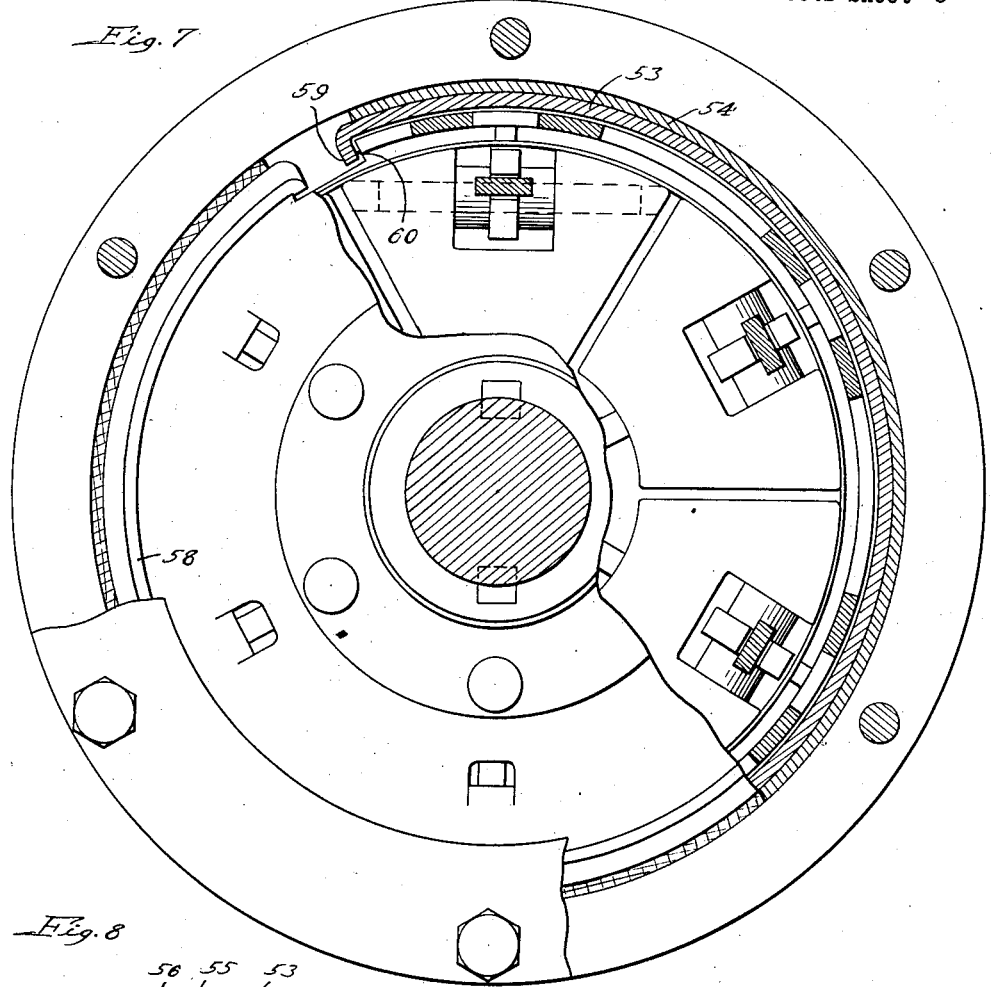
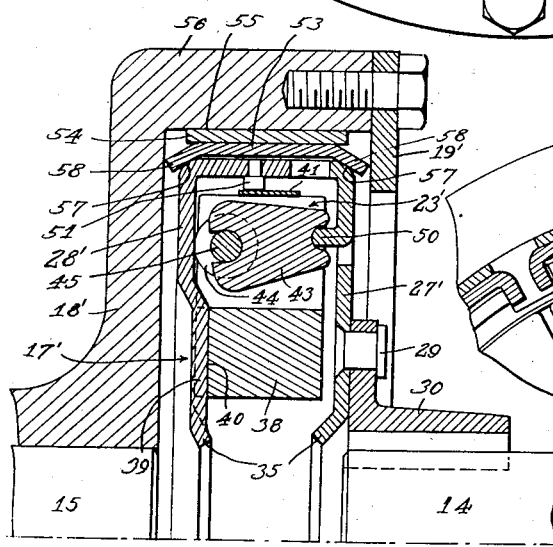
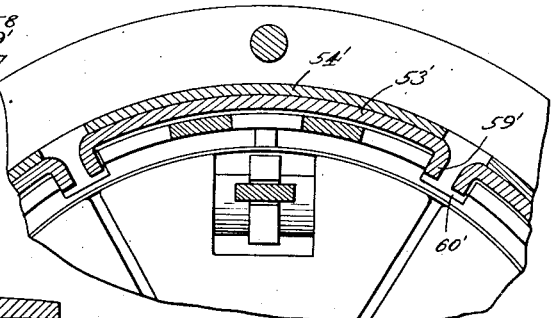

Patented Nov. 21, 1933

1,936,030

UNITED STATES PATENT OFFICE 1,936,030

CENTRIFUGAL CLUTCH

Carl A. Ruesenberg, Rockford, Ill., assignor to Rockford Drilling Machine Co., Rockford, Ill., a corporation of Illinois Application January 22, 1932. Serial No. 588,134

22 Claims. (Cl. 192—105)

This invention relates to friction clutches and has particular reference to a centrifugal clutch designed to become engaged or disengaged automatically above and below a predetermined speed.

The principal object of my invention is to provide a clutch of the speed responsive type which, in its preferred form, is axially engaged by the spreading apart of the two plates forming the clutch disc.

Another object is to provide in a clutch of this kind a plurality of oscillating levers actuated by radially movable fly-weights which are normally urged inwardly to retracted position by a circumferentially disposed band spring. The oscillating levers are limited in their movement so as not to reach dead center, so that the engagement and disengagement of the clutch is smooth and positive. Friction is also minimized by the use of rollers in connection with the levers whereby to make for smoother and easier operation.

The invention is illustrated in the accompanying drawings, in which—

Figure 3:
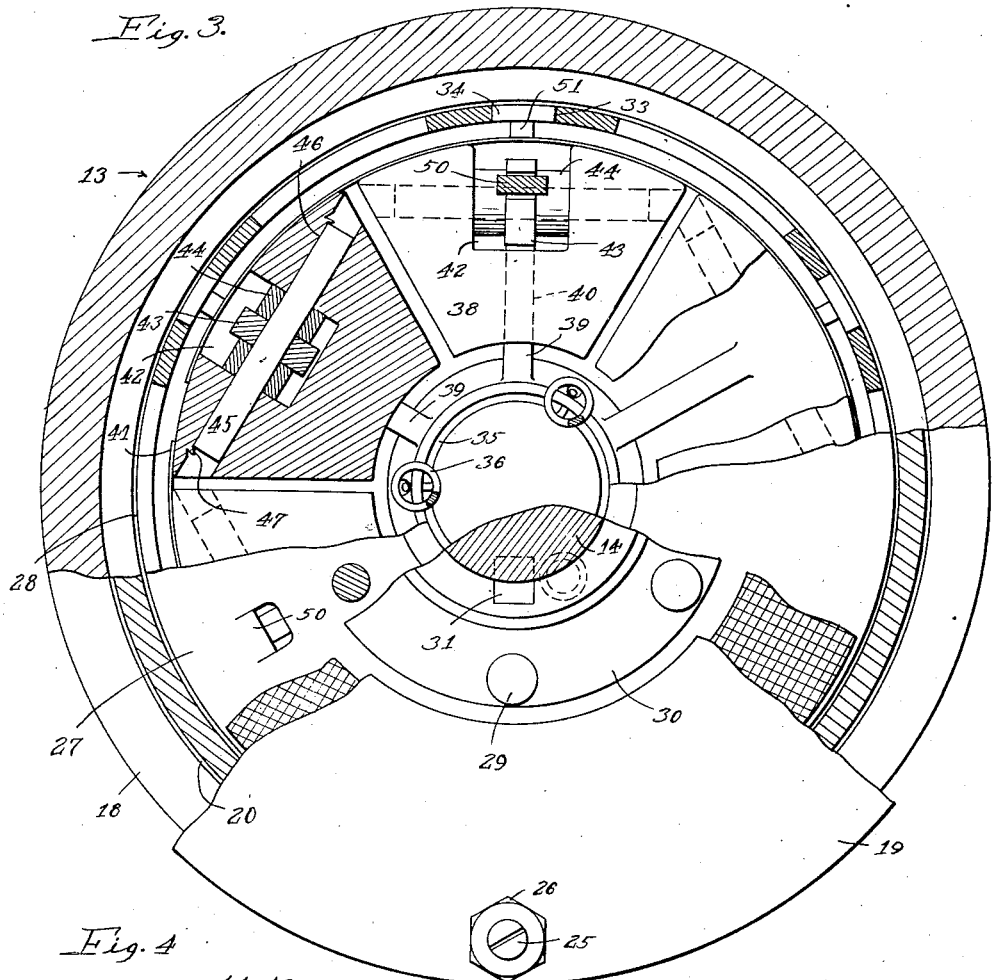
Fig. 3 is a view partly in transverse section and partly in rear elevation.
Figure 4:
Figure 6:
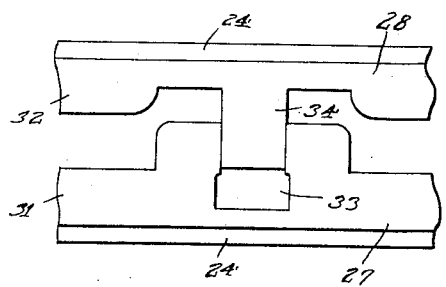
Figure 5:
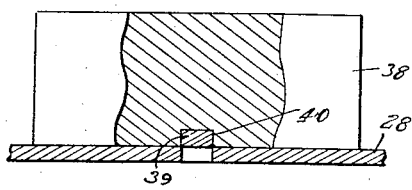

Figs. 4, 5, and 6 are detail views to more clearly illustrate the construction;

Fig. 7 is a view similar to Fig. 3 but showing a modified construction;

Fig. 8 is a longitudinal half section through the clutch of Fig. 7, and

Fig. 9 is a fragmentary transverse section showing a further modification.

Similar reference numerals are applied to corresponding parts throughout the views.

Figure 1:
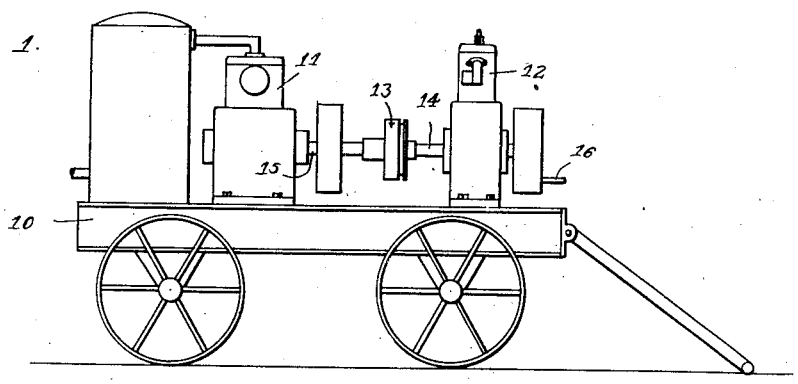
Figure 1 is a side view of a portable air compressor outfit showing the use of the clutch of the present invention between the engine and compressor.
Figure 2:
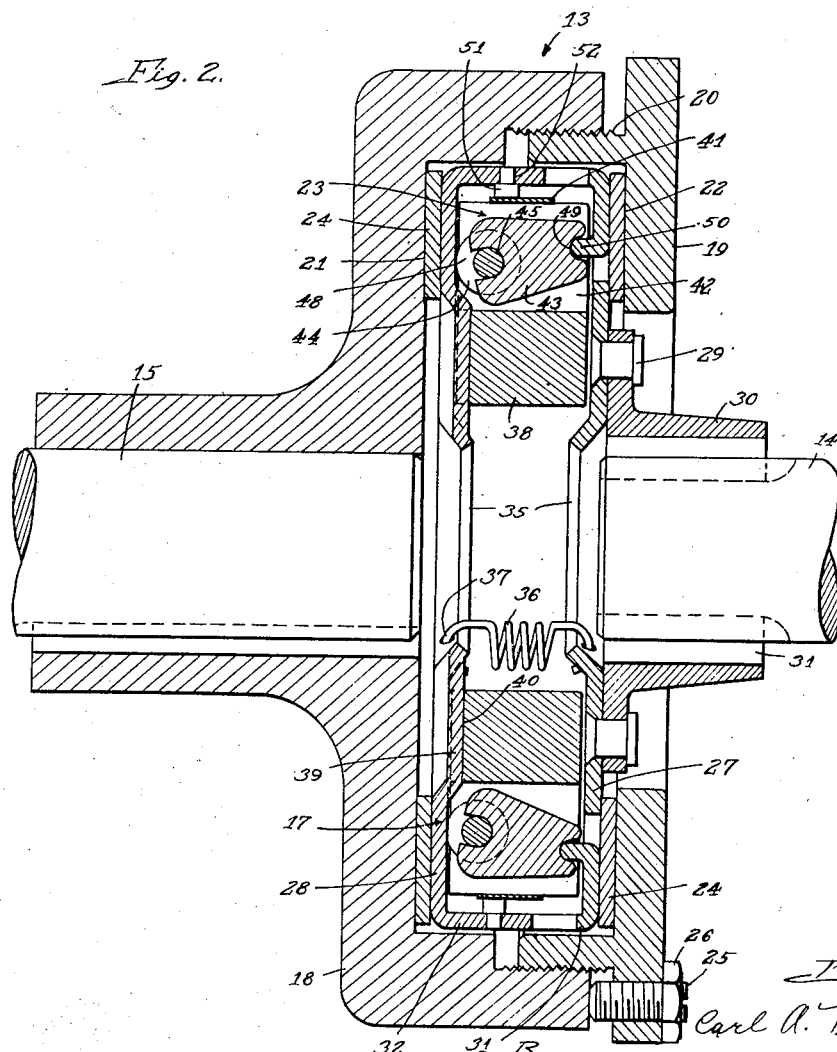
Fig. 2 is a central longitudinal section through the clutch.

In Figure 1, I have illustrated a hand truck 10 on which an air compressor 11 and engine 12 are mounted, interconnected by the clutch designated generally by the reference numeral 13 made in accordance with my invention and which, as will soon appear, has the driving member thereof carried on the shaft 14 turning with the crankshaft of the engine and the driven member fixed on and turning with the shaft 15 for operating the compressor. It is well known what a difficulty it is to crank the engine 12 by means of the hand crank 16 when the engine is directly coupled to the compressor, because in that case, the cranking must be done against the compression of both the engine and compressor. That difficulty is avoided where a centrifugal clutch, such as the clutch 13 made in accordance with my invention, is used to couple the engine and compressor, because the compressor remains disconnected until the engine attains a certain speed. Aside from the advantage of easy starting the clutch 13 offers the further advantage of preventing stalling of the engine, the engine being automatically disconnected from the compressor when its speed drops below a certain R. P. M. A clutch of this kind is also suitable for use in connection with electric motors, especially those having low starting torque and which have to be brought up to a certain speed before the load can be assumed. Such clutches are also suitable for use in industrial plants in connection with the so-called "stand-by" units. Still other uses will appear when the invention is better understood from a reading of the following description.

Referring to Figs. 2-6, the clutch 13 has for its driving member a two-part clutch disc 17 turning with the driving shaft 14 inside the housing 18 which, in turn, constitutes the driven member turning with the driven shaft 15. The housing 18 has a back plate 19 threading thereon, as at 20, to complete the assembly after the clutch disc has been entered in the housing. A drive face 21 is provided on the inside of the housing and another drive face 22 on the inside of the back plate for engagement by the clutch disc 17 when the two parts thereof are spread apart under the action of the centrifugal mechanism, indicated generally by the reference numeral 23. The threading of the back plate 19 permits adjustment thereof to compensate for wear of the pads or facings 24 provided on the clutch disc, and a set screw 25 and lock nut 26 therefor serve to keep the back plate in adjusted position.

The clutch disc 17 comprises two plate or ring sections 27 and 28 of stamped sheet metal, the former of which is fastened as by rivets 29 to a center hub 30 keyed, as indicated at 31, on the shaft 14. The hub, instead of being provided as a separate part, could be formed as an integral projection on the center of the plate 27, and, instead of using keys, a pin or bolt could be provided for fastening the plate to the shaft. The pads or facings 24 are riveted or otherwise suitably secured to the plates 27 and 28. The plates 27 and 28 are stamped to provide annular peripheral flanges 31 and 32, respectively, for reenforcement thereof. The flanges project toward each other, and a plurality of circumferentially spaced slots 33 are formed in the flange 31 to receive lugs 34 formed on the flange 32. The lugs have a close working fit in the slots so as to permit relative axial movement between the sections as required for engagement and disengagement of the clutch, and these connections serve to transmit drive from the plate 28 to the plate 27, and hold the plates in true concentric relation. Annular flanges 35 are also formed on the inner peripheries of the plates for further reenforcement thereof and also to provide places for anchoring the ends of coiled tension springs 36, which it will be observed have their hooked ends entered in holes 37 provided therefor in the flanges. The springs 36 tend normally to urge the plates 27 and 28 toward each other for disengagement of the clutch, and it is against the action of these springs that the centrifugal mechanism 23 operates to spread the plates apart for engagement of the clutch when a predetermined speed is exceeded.

The centrifugal mechanism 23 comprises a plurality of fly-weights 38 of segmental form, as shown in Fig. 3, disposed between the plates 27 and 28 and arranged to move outwardly radially under centrifugal force, the radial movement being insured by forming radial guide ribs 39 on the plate 28 received in radial grooves 40 provided therefor in the abutting face of the weights. The ribs 39 are punched out of the plane of the plate 28, as best appears in Fig. 5, and the weights have the grooves 40 formed so as to have a close working fit on the ribs. A flat band spring 41 fits around the weights 38 circumferentially and tends normally to urge the weights inwardly, and serves to hold the same against outward movement until a predetermined speed is attained at which the centrifugal force developed overcomes the action of the spring. Each of the weights is slotted transversely through the middle of the periphery thereof and substantially radially, as at 42, to provide room for an oscillating lever 43 and two rollers 44 on either side thereof mounted on a crosspin 45 entered in a hole 46 made in the weight crosswise with respect to the slot and near the grooved face. The pin 45 can be held in place in the hole 46 in any suitable way as by punching out spurs 47 in the hole at opposite ends of the pin. The rollers 44 are large enough in diameter to project from the face of the weight to roll on the flat surface provided therefor on the inside of the plate 28. The one end of the lever 43 is forked, as indicated at 48, to fit over the pin 45 between the rollers 44. The other end is also forked, as indicated at 49, to straddle a lug 50 punched inwardly from the plate 27. The lever is of such length that as the weight moves outwardly and the pivots 45 and 50 approach alignment at the same radius with respect to the center of rotation, namely dead center relationship, the rollers 44 traveling in an arc with the pivot 50 as a center, force the plates 27 and 28 apart and press them into firm, frictional engagement with the drive surfaces 21 and 22. In other words, a powerful wedge action is secured with the levers 43 to bring about engagement of the clutch, and since there are six oscillating levers in equally circumferentially spaced relation actuated by six fly-weights, it is evident that the action is not only extremely powerful but smooth and uniform as well. The clutch is shown fully engaged in Fig. 2 and it is evident from an inspection of this view that the levers 43 are not on dead center; hence, there is no danger of the parts binding and preventing disengagement of the clutch when the speed drops sufficiently. The rollers 48 reduce the friction to such an extent that the light tension of the band spring 41 is sufficient to retract the weights when the speed is decreased below a predetermined value. The spring 41 in the present case is aided by the action of springs 36, the effect of which is to urge the plates 27 and 28 toward each other and hence to move the levers 43 inwardly about their pivots 50. The springs 36 may, however, be dispensed with if a spring 41 of the proper increased tension is provided, or, on the other hand, the spring 41 could be dispensed with if springs 36 of the proper increased tension were provided. Naturally, as the facings 24 become worn the levers 43, to secure engagement of the clutch, have to swing outwardly farther, and in order to prevent their reaching dead center, I provide limit stops 51 in the form of pins which have reduced shanks driven into holes 52 provided in the flange 32 of the plate 28. The pins 51 have abutment with the outside of the spring 41 and, through the medium of the spring, prevent the weights from moving outwardly beyond a predetermined point, and hence prevent the levers 43 from coming to dead center. There is, therefore, no possibility of the clutch getting into such a condition where it could not be relied upon to disengage at a certain speed. When the facings 24 are worn to such an extent that the clutch slips or cannot be engaged, the back plate 19 is threaded inwardly on the housing 18 to compensate for the wear.

In Figs. 7 and 8, I have shown a modified or alternative construction in which an expansible peripheral band 53 carrying a facing 54 is provided for engagement with an annular surface 55 on the inside of the rim 56 of the housing 18', instead of having facings 24 on the plates 27' and 28'. The clutch is otherwise of the same construction as that disclosed in Figs. 2-6. A back plate 19' confines the clutch disc 17' in the housing 18' and a centrifugal mechanism 23' similar to that previously described is provided for spreading the plates 27' and 28' of which the disc 17' is composed, to bring about engagement of the clutch. In this case, however, a cam action is secured by the sliding of the rims 57 of the plates 27' and 28' on the inclined flanges 58 formed on the band 53, whereby to expand the band by the spreading apart of the plates. The band 53 has inwardly bent ends 59 received in a notch 60 provided therefor in the periphery of the plates 27' and 28' whereby to transmit drive from the clutch disc to the band and thence to the housing. The band will normally tend to contract so that the bent ends 59 will come together, or nearly so, whereby to have the clutch fully disengaged until the plates 27' and 28' are forced apart by the action of the centrifugal mechanism 23'.

Instead of having a one-piece band the same may be made up of any suitable number of pieces, as illustrated in Fig. 9 in which the segments are numbered 53' and their facings 54'. In this case, the bent ends 59' are received in circumferentially spaced notches 60' provided in the periphery of the plates 27' and 28'. The segments 53' will, of course, be provided with the inclined flanges 58 as in the construction disclosed in Figs. 7 and 8, whereby to secure radial expansion of the band segments when the plates 27' and 28' are forced apart by the action of the centrifugal mechanism 23'.

It is believed the foregoing description conveys a good understanding of the objects and advantages of my invention. The appended claims have been drawn so as to cover all legitimate modifications and adaptations.

I claim:

1. In a centrifugal clutch, the combination of a driving shaft, a clutch housing to be driven disposed concentric with the shaft and having a friction drive surface therein, a clutch disc turning with the shaft and disposed in the housing, said clutch disc comprising a pair of companion sections arranged to be spread apart to secure frictional driving engagement between the clutch disc and said friction drive surface, fly-weights disposed between the sections, means for guiding said weights for rectilineal movement radially outwardly toward the periphery of said sections under centrifugal force, and oscillating levers housed in the weights in recesses provided therefor and pivoted on the one hand on the clutch disc so as to force the clutch disc sections apart when the levers are moved toward dead center position, and pivoted on the fly-weights on the other hand so as to be moved toward dead center when the weights are moved radially outwardly under centrifugal force.

2. In a centrifugal clutch, the combination of a driving shaft, a clutch housing to be driven disposed concentric with the shaft and having a friction drive surface therein, a clutch disc turning with the shaft and disposed in the housing, said clutch disc comprising a pair of companion sections arranged to be spread apart to secure frictional driving engagement between the clutch disc and said friction drive surface, fly-weights between the sections movable radially outwardly under centrifugal force, oscillating levers pivotally mounted on the one hand on the clutch disc to force the clutch disc sections apart when the levers are moved toward a dead center position and pivotally mounted on the fly-weights on the other hand so as to be moved toward dead center in the outward movement of the weights, said weights being of segmental form with the arcuate peripheries together approximating a circle, and a flat circular band spring embracing said weights circumferentially and tending normally to urge the same radially inwardly to retracted position.

3. A clutch as set forth in claim 1 including means for limiting the outward movement of said weights, whereby to prevent the levers from getting to dead center position.

4. A clutch as set forth in claim 1 including means for limiting the outward movement of said weights, whereby to prevent the levers from getting to dead center position, and a flat circular band spring confining the weights circumferentially and tending normally to move the weights inwardly toward retracted position, the said weight movement limiting means being arranged to engage said spring and thereby stop movement of the weights.

5. A clutch as set forth in claim 1 including coiled tension springs extending between the clutch disc sections tending normally to move the same toward each other, and a flat circular band spring confining the weights circumferentially and tending normally to urge the same radially inwardly to retracted position.

6. A clutch as set forth in claim 1 including means for limiting the outward movement of said weights, whereby to prevent the levers from getting to dead center position and a flat circular band spring confining the weights circumferentially and tending normally to move the weights inwardly toward retracted position.

7. In a centrifugal clutch, the combination of a driving shaft, a clutch housing to be driven disposed concentric with the shaft and having a friction drive surface therein, a clutch disc turning with the shaft and disposed in the housing, said clutch disc comprising a pair of companion sections arranged to be spread apart to secure frictional driving engagement between the clutch disc and said friction drive surface, fly-weights disposed between the sections, means for holding the sections in coaxial relation but permitting relative axial movement therebetween, means on at least one of said sections engaging the weights to guide said weights for rectilineal movement bodily radially outwardly toward the periphery of said sections under centrifugal force, and oscillating levers reaching all in the same inclined relation to the axis of rotation from front to back of said weights in recesses provided therein to receive the same, said levers being pivotally mounted at one end on the fly-weights and at their other end on one of the clutch disc sections, so that outward movement of the fly-weights causes a spreading apart of the clutch disc sections under wedge action of said levers.

8. In a centrifugal clutch, the combination of a driving shaft, a clutch housing to be driven disposed concentric with the shaft and having a friction drive surface therein, a clutch disc turning with the shaft and disposed in the housing, said clutch disc comprising a pair of companion sections arranged to be spread apart to secure frictional driving engagement between the clutch disc and said friction drive surface, fly-weights disposed between the sections and movable radially outwardly under centrifugal force, oscillating levers pivotally mounted at one end on the weights and at their other end on one of the clutch disc sections so that outward movement of the weights causes a spreading apart of the clutch disc sections under wedge action of the levers, and roller means on the fly-weights arranged to run on the adjacent clutch disc section to assume the pressure incident to the spreading apart of the clutch disc sections by the wedge action of said levers, instead of having the pressure assumed by the fly-weights, whereby to minimize friction retarding the radial movement of the fly-weights.

9. A clutch as set forth in claim 7 including means limiting the outward movement of the weights so as to limit pivotal movement of said levers, whereby to prevent the levers from getting in a dead center position.

10. In a centrifugal clutch, the combination of a driving shaft, a clutch housing to be driven disposed concentric with the shaft and having a friction drive surface therein, a clutch disc turning with the shaft and disposed in the housing, said clutch disc comprising a pair of companion sections arranged to be spread to secure frictional driving engagement between the clutch disc and said friction drive surface, fly-weights disposed between the sections, means for guiding said weights for radial movement under centrifugal force, the fly-weights each having a longitudinal slot provided therein with a cross-pin extending transversely of one end thereof, an oscillating lever disposed in each of said slots having one end pivoted on the cross-pin and the other end pivoted on the one clutch disc section, whereby outward movement of the fly-weight is arranged to cause a spreading apart of the clutch disc sections under wedge action of said lever, and a roller on the cross-pin projecting from the fly-weight for engagement with the other clutch disc section.

11. A clutch as set forth in claim 10, wherein the fly-weights are of segmental form and have their arcuate peripheries together approximating a circle, the clutch including a flat circular band spring embracing the weights circumferentially and tending normally to urge the same inwardly toward retracted position.

12. A clutch as set forth in claim 10, wherein the clutch disc sections are formed to provide an annular enclosing rim portion, the slots in the weights being through the periphery thereof, and the clutch including means projecting inwardly from the rim portion toward the oscillating levers in said slots for limiting the pivotal movement of said levers to prevent the same from getting into dead center position.

13. A clutch as set forth in claim 1 wherein the clutch disc sections have peripheral flanges projecting toward each other and formed to interengage so as to permit movement toward and away from each other but prevent relative rotation, the clutch including a contractile band spring encircling the weights inside said flanges and tending normally to urge the weights inwardly toward retracted position.

14. In a centrifugal clutch, the combination of a driving shaft, a clutch housing to be driven disposed concentric with the shaft and having a friction drive surface therein, a clutch disc turning with the shaft and disposed in the housing, the same comprising a pair of companion sections arranged to be spread apart to secure frictional driving engagement between the clutch disc and the friction drive surface, fly-weights disposed between the sections and slidable radially outwardly under centrifugal force, antifriction means projecting from one face of said weights for engagement with one of the clutch disc sections for anti-friction sliding movement of the weights with respect to said section, and oscillating levers all disposed in the same inclined relation to the axis of rotation in recesses provided therefor in said weights and having their inner ends pivotally engaging the weights and their outer ends projecting from the other face of the weights and pivotally engaging the other clutch disc section, so that outward movement of the weights causes a spreading apart of the clutch disc sections under wedge action of the levers.

15. A clutch as set forth in claim 14 including a contractile band spring embracing the weights circumferentially and tending normally to urge the weights inwardly toward retracted position when the speed of operation permits of such movement by virtue of the low centrifugal force factor.

16. A clutch as set forth in claim 14 wherein the clutch disc sections have peripheral flanges projecting toward each other and formed to interengage so as to permit movement toward and away from each other but prevent relative rotation, the clutch including a contractile band spring encircling the weights inside said flanges and tending normally to urge the weights inwardly toward retracted position.

17. In a centrifugal clutch, the combination of a driving shaft, a clutch housing to be driven disposed concentric with the shaft and having a friction drive surface therein, a clutch disc turning with the shaft and disposed in the housing, the same comprising a pair of stamped sheet metal sections arranged to be spread apart to secure frictional driving engagement between the clutch disc and said friction drive surface, said sections being formed to provide peripheral flanges projecting toward each other interengaged so as to hold the sections in coaxial relation while permitting axial movement toward and away from each other, the sections being held against turning with respect to each other, the one section being formed to provide radial ribs projecting inwardly therefrom, fly-weights of segmental form disposed between the sections and arranged in a circle in concentric relation with said sections, the weights having radial grooves provided therein to receive the radial ribs so as to guide the weights for radial movement outwardly under centrifugal force, levers disposed in recesses provided in the weights all at a certain angle of inclination with respect to the axis of rotation and having their inner ends pivotally engaging the weights, the outer ends of said levers projecting from the face of the weights, and pivots formed on the adjacent clutch disc section and having the projecting ends of said levers pivotally engaging the same, whereby to force the clutch disc sections apart in the outward movement of the weights.

18. A clutch as set forth in claim 17 including roller means projecting from that face of the weights which is moved toward the adjacent clutch disc section in the wedging action of the levers incident to outward movement of the weights under centrifugal force, said adjacent clutch disc section having track surfaces formed thereon for the roller means to run upon, whereby to permit easy movement of the weights in causing engagement of the clutch.

19. In a centrifugal clutch comprising a driving shaft, a clutch housing to be driven disposed concentric with the shaft and having a friction drive surface therein and a clutch disc turning with the shaft and disposed in the housing and comprising a pair of companion sections arranged to be spread apart to secure frictional driving engagement between the clutch disc and the friction drive surface, the combination of fly-weights disposed between the sections and movable outwardly toward the periphery of said sections under centrifugal force, said weights having bifurcated portions, a cross-pin in each bifurcated portion adjacent one face of the weights, rollers on the cross-pins in the bifurcations projecting from the face for rolling contact with the adjacent clutch disc section, and oscillating levers disposed in the bifurcations pivoted at one end on the cross-pins and having their other ends disposed adjacent the other face of the weights, and means on the other clutch disc section providing fulcrums for the ends of said levers so that all of the levers are disposed at substantially the same angle of inclination with respect to the axis of rotation.

20. A clutch as set forth in claim 19 wherein the oscillating levers are forked at opposite ends to straddle the pivot pin on the weight at one end and to straddle the fulcrum on the clutch disc section at the other end for the predetermined angular movement allowed in the range of movement of the weights.

21. A clutch as set forth in claim 19 including a contractile band spring surrounding the weights peripherally so as to urge the same inwardly as a group toward retracted position.

22. In a clutch as set forth in claim 19 wherein one of the clutch disc sections has a peripheral flange projecting therefrom toward the other section, the clutch including stops projecting inwardly from said flange for limiting outward movement of the weights so as to prevent the levers cooperating with the weights from having sufficient movement to bring the same to a dead center position.

CARL A. RUESENBERG.